United States Patent
Zhang

(10) Patent No.: US 8,768,089 B2
(45) Date of Patent: Jul. 1, 2014

(54) SYSTEM AND METHOD FOR FILTERING AN IMAGE

(75) Inventor: Dong-Qing Zhang, Plainsboro, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 179 days.

(21) Appl. No.: 13/429,161

(22) Filed: Mar. 23, 2012

(65) Prior Publication Data

US 2013/0251284 A1   Sep. 26, 2013

(51) Int. Cl.
  *G06K 9/40*   (2006.01)
(52) U.S. Cl.
  USPC .......................................... 382/261; 382/266
(58) Field of Classification Search
  USPC ................. 382/261, 260, 254, 199, 266, 268
  See application file for complete search history.

(56) References Cited

U.S. PATENT DOCUMENTS 5,128,757 A * 7/1992 Citta et al. ............... 375/240.01
2007/0257988 A1* 11/2007 Ong et al. ..................... 348/182

OTHER PUBLICATIONS

Babu, R., et al., "An HVS-Based No-Reference Perceptual Quality Assessment of JPEG Coded Images Using Neural Networks", IEEE, 2005, pp. 1-4.

* cited by examiner

*Primary Examiner* — Yon Couso
(74) *Attorney, Agent, or Firm* — Slater & Matsil, L.L.P.

(57) ABSTRACT

An embodiment is configured to calculate a perceptual masking factor at a pixel location at a block boundary of the image, calculate a parameter for a filter at the pixel location at the block boundary, and filter the image around the pixel location at the block boundary employing the filter with the calculated parameter. The perceptual masking factor is formed as a product of a background activity masking map and a luminance masking map. The filter includes a parameter that is selected in view of a quality of experience performance measure for the image at the pixel location at the block boundary of the image.

22 Claims, 2 Drawing Sheets

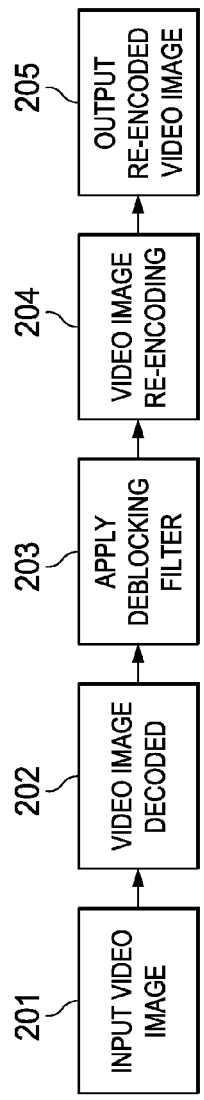
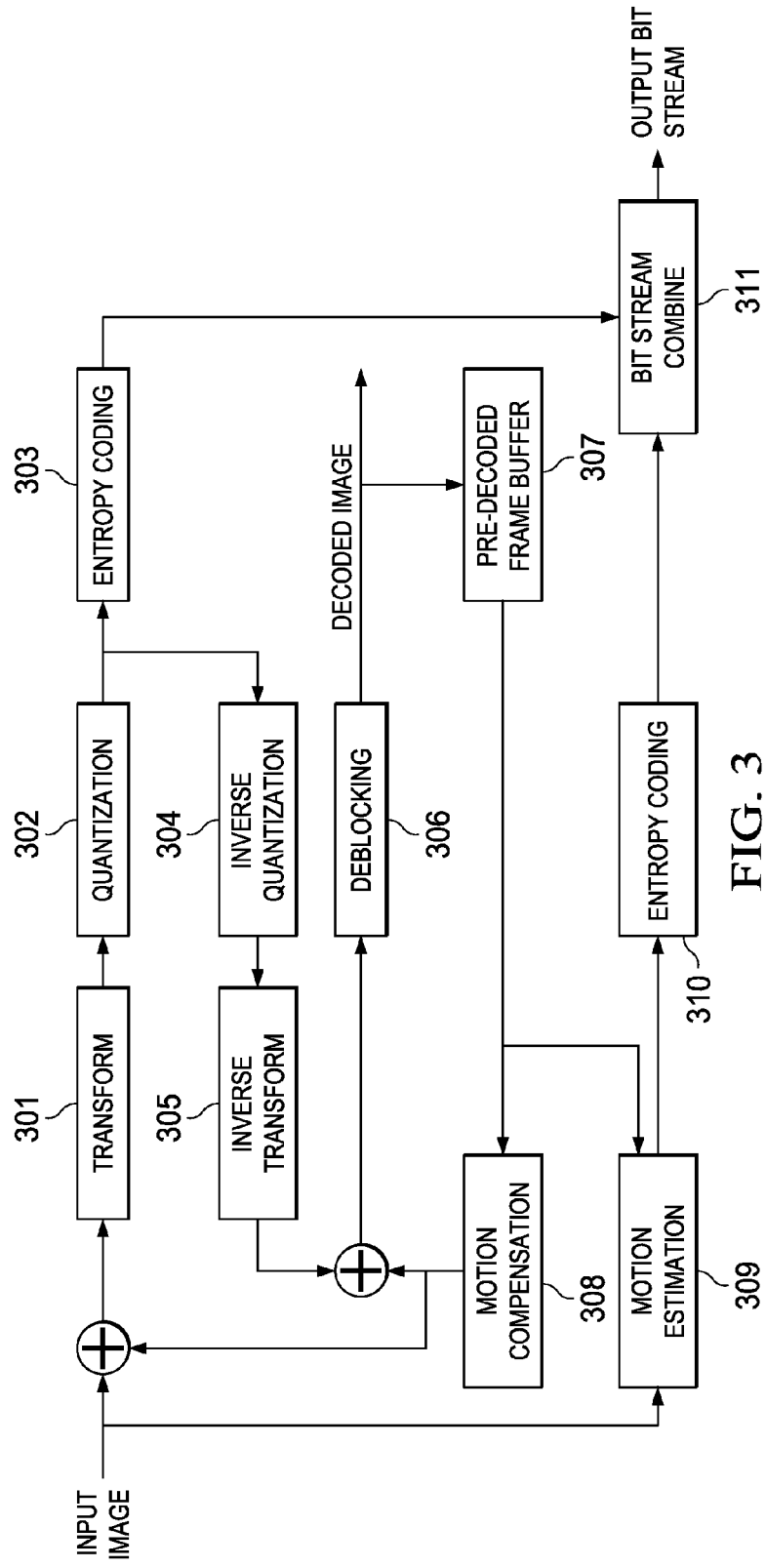

SYSTEM AND METHOD FOR FILTERING AN IMAGE

TECHNICAL FIELD

The present invention relates generally to systems and methods for reducing artifacts in a video frame, and more particularly to systems and methods for filtering an image.

BACKGROUND

Many of the modern image/video coding standards such as the JPEG, MPEG-1, MPEG-2, and MPEG-4/H.264 video coding standards are based on a block-based compression architecture. In a block-based compression architecture, a video image is partitioned into blocks of pixels, such as 8×8 blocks of pixels, and each block is separately encoded. One of the prominent visual artifacts caused by block-based compression is the visible blocking effect created at block boundaries in the decoded images caused by coarse quantization and coefficient truncation. A process to reduce the effects of block-based compression after decoding is referred to as "deblocking." However, conventional deblocking processes generally do not meet the visual expectations of a viewer. Frequently, an image is unnecessarily blurred by a heavy level of image filtering at block boundaries. At a light level of filtering, blurring is generally not visible, but block boundaries often remain visible.

The ability to reduce video block artifacts caused by video compression without compromising perceived image quality would answer an important market need.

SUMMARY OF THE INVENTION

Technical advantages are generally achieved by embodiments which provide an apparatus and method to deblock an image. In an embodiment, the apparatus is formed with a memory and a processor coupled to the memory. The processor, in conjunction with the memory, is configured to calculate a perceptual masking factor at a pixel location at a block boundary of the image, calculate a parameter for a filter at the pixel location at the block boundary, and filter the image around the pixel location at the block boundary employing the filter with the calculated parameter. In an embodiment, the perceptual masking factor includes a product of a background activity masking map and a luminance masking map. In an embodiment, the filter includes a parameter that is selected in view of a quality of experience performance measure for the image at the pixel location at the block boundary of the image.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a block diagram illustrating an application of the process to video transcoding, in accordance with an embodiment;

FIG. 3 illustrates a block diagram of a process flow for encoding and decoding an input image, including deblocking of the decoded image, in accordance with an embodiment.

DETAILED DESCRIPTION OF ILLUSTRATIVE EMBODIMENTS

Figure 1:
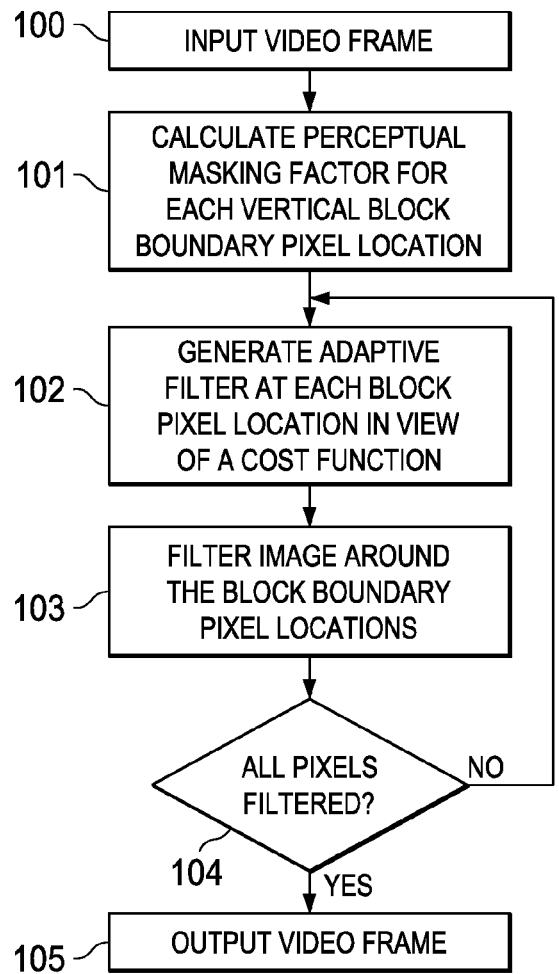
FIG. 1 illustrates a flowchart of a process for an adaptive deblocking filter, in accordance with an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention and do not limit the scope of the invention.

An embodiment of process is introduced herein to maximize human perceived visual quality in a video frame as represented by a perceptual quality of experience ("QoE") metric rather than through non-perceptual quality metrics, such as peak signal-to-noise ratio ("PSNR"), mean square error, etc.

When a video frame of pixels is encoded, it is generally partitioned into pixel blocks, typically 8×8 blocks or 4×4 blocks, which are separately transformed into a spatial frequency domain and then encoded to reduce a bandwidth of a transmitted signal. A common result is production of visual artifacts/discontinuities at junctures between adjacent blocks when the signal is decoded at a receiver and the original video frame is reconstructed.

Reduction of artifacts at edges of video blocks, or "video deblocking," is an important component in a modern video encoding architecture, and video deblocking can significantly improve video quality and video compression efficiency during video transcoding. Most existing video deblocking processes reduce block artifacts by hand-designed ad hoc filters, e.g., as described in video encoding specification H.264 or by optimizing with non-perceptual quality metrics, which may not result in the best perceptual quality output perceived by human eyes.

A video image is filtered to maximize a QoE value. Generally, pixels around blocks are filtered one at a time, and the video image is generally filtered at block boundaries. The image can be filtered before or after it is encoded into blocks, depending on an application.

Video transcoding consists of two processes, video decoding and video re-encoding, often into another format. In video transcoding, the video image is filtered before re-encoding, as illustrated and described hereinbelow with reference to FIG. 2. In a video encoding framework, such as described by video encoding specification H.264, a deblocking filter is employed inside a video coding loop, such as illustrated and described hereinbelow with reference to FIG. 3.

An embodiment of new video deblocking process is introduced that generates an adaptive deblocking filter to maximize a perceptual QoE metric that closely represents human vision perception. The new video deblocking process maximizes a no-reference QoE metric, which is an objective perceptual QoE metric that does not rely on an original video image. In order to get tractable results, a simplified metric is used as represented below by equation (1) for deblocking in the horizontal direction:

$$\text{QoE}(I) = C \cdot \exp\{-d(\Sigma_{x \in \Omega_H} w_x \nabla_x I(x))\}. \tag{1}$$

In short, the physical meaning of equation (1) is a summation of image slopes at the block boundary edges weighted by perceptual masking factors. Higher block edge slope magnitude will contribute to lower quality score. A corresponding equation can be written for deblocking the vertical direction. The procedure for filtering the image along the horizontal direction can be similarly employed for filtering along the vertical direction. In an embodiment, the input image is rotated 90°, and the process employed for deblocking in the horizontal direction is employed for the vertical direction. Without loss of generality, the following description only focuses on horizontal filtering.

In equation (1), QoE(I) is a no-reference QoE metric of an input image I, exp(.) is the exponential function, C is a normalization constant so that the QoE metric is invariant to image size, d is another constant for scaling the function. The set $\Omega_H$ is the set of pixels at a block boundary along a vertical direction, e.g., pixels whose x coordinates are multiples of 8, i.e., x=8n if MPEG-1 or MPEG-2 encoding is used; otherwise the multiplier of n could be, e.g., 4 or 8 for video encoding specification H.264 encoding or another encoding/compression process. The gradient $\nabla_x I$ is the horizontal gradients of the image I, respectively.

The parameter $w_x$ is a perceptual masking factor at pixel location x. The parameter $w_x$ is a value at each pixel location in a map of perceptual masking factors produced by processing the input image. The map of perceptual masking factors is directed to producing a deblocked image as judged by the human vision system ("HVS").

The perceptual masking factor $w_x$ is determined by a product of two factors, background activity masking, and luminance masking. The map of perceptual masking factors is produced by multiplication of a background activity masking map M(i, j) and a luminance masking map $W_l$(i, j).

Background activity masking is indicative of if there is a lot of texture around a block boundary location, the block artifact can hardly be seen by human eyes. A horizontal background activity masking map $M_h$(i, j) is obtained by first applying a filter $F_{ah}$ to the image I(x, y):

$$A_h = I(x,y) \cdot F_{ah}, \quad (2)$$

where the filter $F_{ah}$ is given by the matrix:

$$F_{ah} = \frac{1}{8} \cdot \begin{bmatrix} 1 & -1 & 1 & -1 & 1 & -1 & 1 & -1 \\ 0 & 0 & 0 & 0 & 0 & 0 & 0 & 0 \\ -1 & 1 & -1 & 1 & -1 & 1 & -1 & 1 \end{bmatrix}.$$

The activity pixel values of the resulting filtered image are normalized to the range [0, −1]. The horizontal background activity map $M_h$(i, j) is then obtained by thresholding the filtered image $A_h$ to produce a horizontally filtered and thresholded image $M_h$(i, j):

$M_h(i,j)=1$, if $A_h(i,j)<\alpha$ $M_h(i,j)=0$, otherwise where $\alpha$ is a threshold value, which, in an embodiment, is set to 0.05.

Likewise, the luminance masking factor is representative of the likelihood that blocking artifacts are hidden from human eyes due to background darkness. A luminance masking map, which is the same for horizontal and vertical directions, is obtained by applying a low-pass filter followed by a clipping process:

$W_1(i, j) = \sqrt{\dfrac{I_Z(i, j)}{128}}$ if $I_1(i, j) < 128$ $W_1(i, j) = 1$ otherwise, where $I_l = I \cdot F_{lp}$, and $F_{lp}$ is the low-pass filter $$F_{lp} = \begin{bmatrix} 1 & 0 & 1 \\ 0 & 0 & 0 \\ 1 & 0 & 1 \end{bmatrix}.$$

The final perceptual masking map for the horizontal direction is the product of $M_h$(i, j) and $W_l$(i, j):

$w_x = W(i,j) = M_h(i,j) \cdot W_l(i,j).$

The value of the perceptual masking factor may also be determined by other factors.

Based on the above formulation, the deblocking process introduced herein finds a transform or filtering scheme that filters the image I in view of the total QoE value QoE(I). In an embodiment, the deblocking process introduced herein finds a transform or filtering scheme that filters the image I to maximize the total QoE value QoE(I). If a linear adaptive filtering scheme is used that applies a finite impulse response ("FIR") filter at each block boundary pixel location, then the value of the QoE(I) function can be increased, e.g., maximized by minimizing the inner term of equation (1) separately at each block boundary pixel location. Accordingly, a filter G can be found that minimizes $w_x (\nabla_x (G \otimes I))(x)$ separately at each horizontal block boundary pixel location, where $\otimes$ is the convolution or filtering operator.

However, if the above cost/QoE metric function is directly minimized, the result will be a smoothing filtering function G with high smoothing strength, which will result in a blurred image. Instead, a regularized cost function L(G) depending on the filtering function G as illustrated below for the horizontal direction is reduced, e.g., minimized, $L(G) = w_x [(\nabla_x (G \otimes I))(x)]^2 + \lambda \{[G \otimes I](x) - I(x)\}^2,$ where $\lambda \{[G \otimes I](x) - I(x)\}^2$ is a regularization term to enforce the filtering result to retain a certain degree of fidelity with respective to the input image, and $\lambda$ is a weighting factor. The regularization term is a measure of the difference between the image filtered with the filtering function G and the unfiltered image. A corresponding equation can be written for the vertical direction. A higher value for the weighting factor $\lambda$ results in a sharper image but with more unfiltered block artifacts. The filtering function G should generally be a smoothing filter (or low-pass filter) which can be chosen as a Gaussian filter, which has a standard deviation parameter $\sigma$. The standard deviation parameter $\sigma$ represents a strength of the smoothing filter. For a non-Gaussian filter, a parameter other than a standard deviation parameter $\sigma$ can be used. A higher value for $\sigma$ (or the other parameter) produces a smoother image.

Accordingly, the following function is reduced, e.g., minimized at each block boundary pixel location in the horizontal direction with respective to a parameter such as a standard deviation parameter $\sigma$ for which an optimal value will be found. The parameter $\sigma$ can be constrained to fall within a range, such as the range [0, 3] for the standard deviation parameter $\sigma$ for a Gaussian filter. In an embodiment, a corresponding function is minimized at each block boundary pixel location in the vertical direction with respect to a parameter such as a standard deviation parameter.

$L(\sigma) = w_x [(\nabla_x (G(\sigma) \otimes I))(x)]^2 + \lambda \{[G(\sigma) \otimes I](x) - I(x)\}^2.$ The above optimization/minimization problem can be performed by different methods and processes. In an embodiment, a desired/optimal standard deviation parameter $\sigma$ can be found by an exhaustive search within a certain range and a certain sampling interval at each boundary pixel location. In an example embodiment, the range of σ is from 0 to 3.0, and the sampling interval is 0.3, which results in eleven σ values that the process has to compute. Such settings can yield satisfactory results and reasonable speed. In an embodiment, which may result in a faster search speed, a gradient descent scheme employs a step-controlling iteration parameter γ to find an optimal value for σ that reduces the value of/minimizes L(σ) at each block boundary pixel location:

$$\sigma(n+1)=\sigma(n)-\gamma \nabla L(\sigma(n)) \quad (2)$$

where ∇L is the local gradient of the cost function L(σ). After mathematic derivation, the gradient ∇L(σ) has the following form:

$$\nabla L(\sigma)=2w_x[G_x \otimes I](x) \cdot [G_{x\sigma} \otimes I](x)+2\lambda([G \otimes I](x)-I(x)) \cdot [G_\sigma \otimes I](x),$$

where $G_x$ is the first-order derivative of G with respective to x, $G_\sigma$ is the first-order derivative of G with respective to σ, and $G_{x\sigma}$ is the second-order derivative of G. In an embodiment, these functions exhibit the following forms:

$$G(x) = \frac{2}{\sqrt{2\pi\sigma^2}}\exp\left\{-\frac{x^2}{2\sigma^2}\right\} \quad (3)$$

$$G_x(x) = G(x)\frac{-x}{\sigma^2}$$

$$G_\sigma(x) = G(x)\left(\frac{x^2}{\sigma^3}-\frac{1}{\sigma}\right)$$

$$G_{x\sigma}(x) = G(x)\left(\frac{3x}{\sigma^3}-\frac{x^3}{\sigma^5}\right)$$

Turning now to FIG. 1, illustrated is a flowchart of a process for an adaptive deblocking filter in accordance with an embodiment. In block or step 100, a video frame is inputted to the process. In block or step 101, the perceptual masking factor $w_x$ is calculated for each vertical block boundary pixel location. Similarly, the perceptual masking factor $w_y$ is calculated for each horizontal block boundary pixel location. Then the process enters into a loop, which iterates over all block boundary pixels. In block or step 102, for each block boundary pixel location, the standard deviation parameter σ is calculated employing a search such as an exhaustive search or by using equation (2). After the desired/optimal parameter σ is found, the parameter σ is used to generate a filter kernel, such as a Gaussian filter kernel as in equation (3). The Gaussian filter with infinite filter support can be truncated, e.g., at a 4-σ level, to produce a discrete filter kernel. Accordingly, the width of the filter kernel is determined. In an embodiment, the width of the discrete filter kernel is 4σ. Because the perceptual masking factor and image content are generally different at each pixel location, the generated filters usually are also different for each pixel location. Therefore, the process is an adaptive filtering process. After the adaptive filter is generated, the process proceeds to block or step 103, which filters the image around the block boundary pixel locations. In block or step 104, the process determines whether or not all boundary pixels have been filtered. If all pixels are not filtered, the process returns to block or step 102 to continue the adaptive filtering processing. If all pixels are filtered, the process proceeds to block or step 105 and outputs the video frame.

Turning now to FIG. 2, illustrated is a block diagram illustrating application of the process to video transcoding, in accordance with an embodiment. Video transcoding refers to a process wherein an encoded image is decoded and then re-encoded in another format, which may be required when an end device does not support the original format. In block or step 201, the video image encoded in a first format is input to the process. In block or step 202, the video image is decoded. In block or step 203 a deblocking filter is applied at horizontal and vertical block boundary pixel locations. In step or block 204, the deblocked image is re-encoded in a second format. In block or step 205, the re-encoded video image is outputted.

Turning now to FIG. 3, illustrated is a block diagram of a process flow for encoding and decoding an input image, such as by using the encoding and decoding standard H.264, including deblocking of the decoded image in accordance with an embodiment. An unencoded block of the input video image, such as an 8×8 block, is supplied to transform block or step 301, in which the input block of the input image is transformed into a spatial frequency domain, e.g., using a discrete cosine transform. A discrete cosine transform can be applied to a pixelated input image represented with real pixel values. In block or step 302, the transformed block of the input image is quantized. In block or step 303, the transformed and quantized block of the input image is encoded, e.g., by employing a Huffman or Huffman-like code. In block or step 311, the encoded transformed and quantized block of the input image is combined with other encoded and further processed blocks, and the resulting combined bit stream is outputted.

In blocks or steps 304 and 305, the transformed and quantized block of the input image produced by blocks or steps 301 and 302 are inversely quantized and inversely transformed to produce an unencoded image. In block or step 306, a deblocking operation is performed to produce a decoded and deblocked image, as described hereinabove, which in step or block 307 is stored in a pre-decoded frame buffer. In blocks 308 and 309, motion compensation and motion estimation are performed on the blocks of the input image. In block or step 310, the motion-compensated and motion-estimated blocks are encoded for combining with other encoded and processed blocks of the input image.

The process introduced herein reduces block image artifacts by producing filters that directly maximize an objective perceptual QoE metric, which essentially maximizes the human perceived quality about an image or video frame. Conversely, conventional filtering processes generally filter images using hand-designed filters or other non-perceptual metrics that may not result in optimal deblocking results in terms of human perception.

Figure 4:
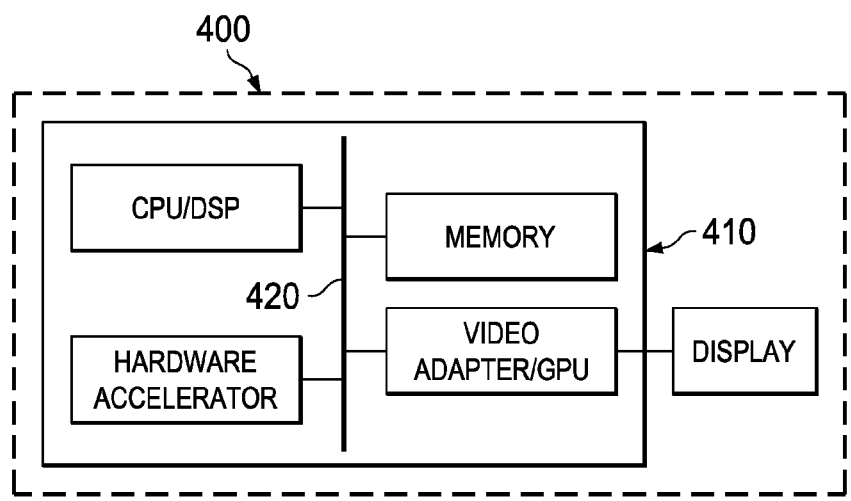
FIG. 4 illustrates a block diagram of elements of a processing system that may be used to perform one or more of the processes discussed herein, in accordance with an embodiment.

Referring now to FIG. 4, illustrated is a block diagram of elements of a processing system 400 that may be used to perform one or more of the processes discussed hereinabove in accordance with an embodiment. The processing system 400 may include a processor 410 equipped with one or more input/output devices, such as a video adapter/graphics processing unit ("GPU"). The processor 410 may include a central processing unit or digital signal processor ("CPU" or "DSP"), memory, and a hardware accelerator connected to a bus 420.

The bus 420 may be one or more of any type of several bus architectures including a memory bus or memory controller, a peripheral bus, video bus, or the like. The CPU may be formed with any type of electronic data processor. The memory may be formed with any type of system memory such as static random access memory ("SRAM"), dynamic random access memory ("DRAM"), synchronous DRAM ("SDRAM"), read-only memory ("ROM"), nonvolatile random access memory ("NVRAM"), a combination thereof, or the like. In an embodiment, the memory may include ROM for use at boot-up and DRAM for data storage for use while executing programs.

The video adapter/GPU provides an interface to couple an external input and output from a display to the processor. Other devices may be coupled to the processor and additional or fewer interface cards may be utilized. For example, a serial interface card not shown) may be used to provide a serial interface for a printer.

The processor may also include a network interface (not shown), which can be a wired link, such as an Ethernet cable or the like and/or a wireless link to enable communication with a network, such as a cellular communication network. The network interface allows the processor to communicate with remote units via the network. In an embodiment, the processor is coupled to a local-area network or a wide-area network to provide communications to remote devices, such as other processors, the Internet, remote storage facilities, or the like.

It should be noted that the processing system may include other components. For example, the processing system may include power supplies, cables, a motherboard, removable storage media, cases, and the like. These other components, although not shown, are considered part of the processing system.

It is noted that, unless indicated otherwise, functions described herein can be performed in either hardware or software, or some combination thereof, with or without human intervention. In an embodiment, the functions are performed by a processor, such as a computer or an electronic data processor, such as that discussed hereinabove with reference to FIG. 4, in accordance with code such as computer program code, software, and/or integrated circuits that are coded to perform such functions, unless indicated otherwise.

Embodiments such as those presented herein provide an apparatus and a related method to filter an image. In an embodiment, the apparatus is formed with a memory and a processor coupled to the memory. The processor, in conjunction with the memory, is configured to calculate a perceptual masking factor at a pixel location at a block boundary of the image, calculate a parameter for a filter at the pixel location at the block boundary, and filter the image around the pixel location at the block boundary employing the filter with the calculated parameter. The processor, in conjunction with the memory, is configured to calculate a perceptual masking factor at a pixel location at a horizontal block boundary of the image, calculate a parameter for a filter at the pixel location at the horizontal block boundary, and filter the image around the pixel location at the horizontal block boundary employing the filter with the calculated parameter. In an embodiment, the perceptual masking factor is formed with a product of a background activity masking map and a luminance masking map.

In an embodiment, the filter is formed with a parameter that is selected in view of a quality of experience performance measure for the image at the pixel location at the block boundary of the image. In an embodiment, the filter is formed with a parameter that is selected to maximize a quality of experience performance measure for the image at the pixel location at the block boundary of the image. In an embodiment, the parameter is a standard deviation parameter.

In an embodiment, the quality of experience performance measure includes a summation of image slopes at block boundaries weighted by the perceptual masking factor. In an embodiment, the parameter is selected in view of a quality of experience performance measure for the image employing a search over a limited range of values for the parameter. In an embodiment, the parameter is selected in view of a quality of experience performance measure for the image employing an exhaustive search over a limited range of values for the parameter. In an embodiment, the filter is a Gaussian filter. In an embodiment, the block boundary is a horizontal block boundary.

In an embodiment, the processor, in conjunction with the memory, is further configured to calculate a perceptual masking factor at a pixel location at a vertical block boundary of the image, calculate a parameter for a filter at the pixel location at the vertical block boundary, and filter the image around the pixel location at the vertical block boundary employing the filter with the calculated parameter. In an embodiment, the processor, in conjunction with the memory, is further configured to filter the image at pixel locations to a left and to a right of the block boundary employing the filter with the calculated parameter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus configured to filter an image, comprising:
a memory; and
a processor coupled to the memory, the processor, in conjunction with the memory, configured to, separately for each pixel location at a horizontal or vertical block boundary of the image:
calculate a perceptual masking factor at the pixel location at the block boundary of the image,
calculate a parameter for a filter at the pixel location at the block boundary by minimizing a regularized cost function for the parameter, and
filter the image around the pixel location at the block boundary employing the filter with the calculated parameter.

2. The apparatus as in claim 1 wherein the perceptual masking factor comprises a product of a background activity masking map and a luminance masking map.

3. The apparatus as in claim 1 wherein the parameter is calculated for each pixel location in view of a quality of experience performance measure for the image at the pixel location at the block boundary of the image.

4. The apparatus as in claim 3 wherein the parameter is calculated for each pixel location to maximize the quality of experience performance measure for the image at the pixel location at the block boundary of the image.

5. The apparatus as in claim 3 wherein the parameter is calculated for each pixel location in view of the quality of experience performance measure for the image employing a search over a limited range of values for the parameter.

6. The apparatus as in claim 3 wherein the quality of experience performance measure comprises a summation of image slopes at block boundaries weighted by the perceptual masking factor.

7. The apparatus as in claim 1 wherein the parameter comprises a standard deviation parameter.

8. The apparatus as in claim 1 wherein the filter comprises a Gaussian filter.

9. The apparatus as in claim 1 wherein the block boundary is the horizontal block boundary.

10. The apparatus as in claim 9 wherein the processor, in conjunction with the memory, is further configured to, separately for each pixel location at the vertical block boundary of the image:
- calculate the perceptual masking factor at the pixel location at the vertical block boundary of the image;
- calculate the parameter for the filter at the pixel location at the vertical block boundary by minimizing the regularized cost function for the parameter; and
- filter the image around the pixel location at the vertical block boundary employing the filter with the calculated parameter.

11. The apparatus as in claim 1 wherein the processor, in conjunction with the memory, is further configured to filter the image at pixel locations to a left and to a right of the block boundary employing the filter with the calculated parameter.

12. A method of filtering an image, the method comprising:
- separately for each pixel location at a horizontal or vertical block boundary of the image:
  - calculating, by a processor, a perceptual masking factor at the pixel location at the block boundary of the image;
  - calculating, by the processor, a parameter for a filter at the pixel location at the block boundary by minimizing a regularized cost function for the parameter; and
  - filtering, by the processor, the image around the pixel location at the block boundary employing the filter with the calculated parameter.

13. The method as recited in claim 12 wherein the perceptual masking factor comprises a product of a background activity masking map and a luminance masking map.

14. The method as recited in claim 12 wherein the parameter is calculated for each pixel location in view of a quality of experience performance measure for the image at the pixel location at the block boundary of the image.

15. The method as recited in claim 14 wherein the quality of experience performance measure comprises a summation of image slopes at block boundaries weighted by the perceptual masking factor.

16. The method as recited in claim 12 wherein the parameter comprises a standard deviation parameter.

17. The method as recited in claim 12 wherein the filter comprises a Gaussian filter.

18. The method as recited in claim 12 wherein the block boundary is the horizontal block boundary.

19. The method as recited in claim 18 further comprising:
- separately for each pixel location at the vertical block boundary of the image:
  - calculating the perceptual masking factor at the pixel location at the vertical block boundary of the image;
  - calculating the parameter for the filter at the pixel location at the vertical block boundary by minimizing the regularized cost function for the parameter; and
  - filtering the image around the pixel location at the vertical block boundary employing the filter with the calculated parameter.

20. The method as in claim 12 further comprising filtering the image at pixel locations to a left and to a right of the block boundary employing the filter with the calculated parameter.

21. The method as recited in claim 12 further comprising calculating the parameter for each pixel location using a local gradient of the regularized cost function.

22. The apparatus as in claim 1 wherein the processor is configured to calculate the parameter for each pixel location using a local gradient of the regularized cost function.

* * * * *